(12) United States Patent
Arnold

(10) Patent No.: US 7,337,218 B2
(45) Date of Patent: *Feb. 26, 2008

(54) SECURE SERVER-BASED IDENTIFICATION FOR SIMPLIFIED ONLINE TRANSACTION PROCESSING WITH PALMTOP COMPUTER

(75) Inventor: Greg Arnold, Sunnyvale, CA (US)

(73) Assignee: PalmSource, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/237,626

(22) Filed: Sep. 27, 2005

(65) Prior Publication Data

US 2006/0190564 A1 Aug. 24, 2006

Related U.S. Application Data

(63) Continuation of application No. 09/541,378, filed on Mar. 31, 2000, now Pat. No. 6,950,857.

(51) Int. Cl.
*G06F 15/16* (2006.01)

(52) U.S. Cl. ............... 709/217; 709/203; 709/218; 709/219; 370/401; 455/419; 455/445; 455/461

(58) Field of Classification Search ............ 709/203, 709/217, 218, 219; 370/401; 455/419, 422.1, 455/445, 461
See application file for complete search history.

(56) References Cited

U.S. PATENT DOCUMENTS 5,742,905 A 4/1998 Pepe et al. ............... 455/461
6,199,099 B1 3/2001 Gershman et al. ......... 709/203
6,421,714 B1 7/2002 Rai et al. .................. 709/217
6,477,565 B1* 11/2002 Daswani et al. ........... 709/217
6,490,601 B1* 12/2002 Markus et al. ............. 715/507
6,512,919 B2 1/2003 Ogasawara ............. 455/422.1
6,587,836 B1 7/2003 Ahlberg et al. ............ 705/26
7,050,961 B1* 5/2006 Lee et al. .................. 703/22
7,082,418 B2* 7/2006 Levy et al. ................ 706/12
2002/0087632 A1* 7/2002 Keskar ..................... 709/204
2004/0064566 A1* 4/2004 Striemer ................... 709/228
2004/0107283 A1* 6/2004 Paddon ..................... 709/229

FOREIGN PATENT DOCUMENTS

EP 000918424 A2 5/1999

* cited by examiner

*Primary Examiner*—Thu Ha Nguyen
(74) *Attorney, Agent, or Firm*—Berry & Associates P.C.

(57) ABSTRACT

A secure simplified transaction processing method and apparatus for a palmtop computer. Sensitive personal information is stored in a secure personal information database. A site map database contains information which maps the fields of the personal information database to frames of a Web page. On request of a palmtop computer, a robot program correlates the personal information fields with the frames of the Web page and sends the personal information back to the palmtop computer. The palmtop computer uses this information to automatically populate the frames of a Web clipping representing a Web page. This has the advantage that the user does not have to manually fill in the frames of the web clipping while providing security for sensitive information.

18 Claims, 8 Drawing Sheets

SECURE SERVER-BASED IDENTIFICATION FOR SIMPLIFIED ONLINE TRANSACTION PROCESSING WITH PALMTOP COMPUTER

CROSS REFERENCE TO RELATED APPLICATIONS

This application is a continuation application of application Ser. No. 09/541,378, entitled "Secure Server-Based Identification for Simplified Online Transaction Processing With Palmtop Computer," filed Mar. 31, 2000, to be issued as U.S. Pat. No. 6,950,857, and assigned to the assignee of the present application. The subject matter in the above-identified co-pending and commonly owned application is incorporated herein by reference.

BACKGROUND OF THE INVENTION

1. Field of the Invention

The present invention relates to the field of transaction processing using a palmtop computer.

2. Background

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PI M) applications such as an address book, a daily organizer and electronic notepads, to name a few.

Due to the small size of such palmtop computers, they are convenient to carry in a pocket or purse. Unfortunately, they are also easily lost or stolen due to their small size. As such, it is generally undesirable to store sensitive information such as credit or debit card numbers in such a device. With the latest generation of palmtop computers, which include an internal RF transceiver, a user is able carry out many types of online transactions from almost anywhere. Such transactions typically require the user to enter substantial amounts of information such as name, address and credit card number. Unfortunately, the small size makes even the best data entry schemes somewhat tedious and error prone. Therefore, it would be useful to provide a way to utilize storage outside the palmtop computer to store sensitive information, while still permitting quick access to that information to facilitate transaction processing.

SUMMARY OF THE INVENTION

Accordingly, what is needed is a method and apparatus for secure transaction processing which can be utilized with a palmtop computer, but which utilizes storage facilities of a remote server. A method and system are described for providing such method and apparatus.

In certain embodiments of the invention, a secure simplified transaction processing method and apparatus for a palmtop computer is disclosed. Sensitive personal information is stored in a secure personal information database. A site map database contains information which maps the fields of the personal information database to frames of a Web page. On request of a palmtop computer, a robot program correlates the personal information fields with the frames of the Web page and sends the personal information back to the palmtop computer. The palmtop computer uses this information to automatically populate the frames of a Web clipping representing a Web page. This has the advantage that the user does not have to manually fill in the frames of the web clipping while providing security for sensitive information.

In accordance with a method of certain embodiments of the invention, a method for providing transaction processing in a palmtop computer, is implemented by: providing a file server; providing a personal information database, residing on the file server, containing personal information data relating to a user of the palmtop computer; providing a site map database, residing on the file server, the site map database containing data which maps fields of the personal information database to frames of known Web clippings; receiving a request from a palmtop computer to populate frames of a selected Web clipping; retrieving personal information data from the personal information database for fields mapped to the frame in, the selected Web clipping in the site map database; and transmitting the retrieved personal information to the palmtop computer.

A method according to another embodiment of the present invention provides simplified transaction processing in a palmtop computer by: sending a request from the palmtop computer to a file server to obtain information to populate a plurality of frames of a selected Web clipping; receiving a transmission from the file server containing personal information data extracted from a personal information database, the personal information database residing on the file server and containing personal information data relating to a user of the palmtop computer; wherein, the personal information being retrieved from fields in the personal information database have been mapped to frames in the selected Web clipping in the site map database.

A palmtop computer, in accordance with certain embodiments of the present invention has a radio frequency transmitter for sending a request from the palmtop computer to a file server to obtain information to populate a plurality of frames of a selected Web clipping. A radio receiver receives a transmission from the file sewer containing personal information data extracted from a personal information database, the personal information database residing on the file server, and containing personal information data relating to a user of the palmtop computer. A processor populates the frames of the selected Web clipping with the personal information data received.

DETAILED DESCRIPTION OF THE INVENTION

Figure 1:
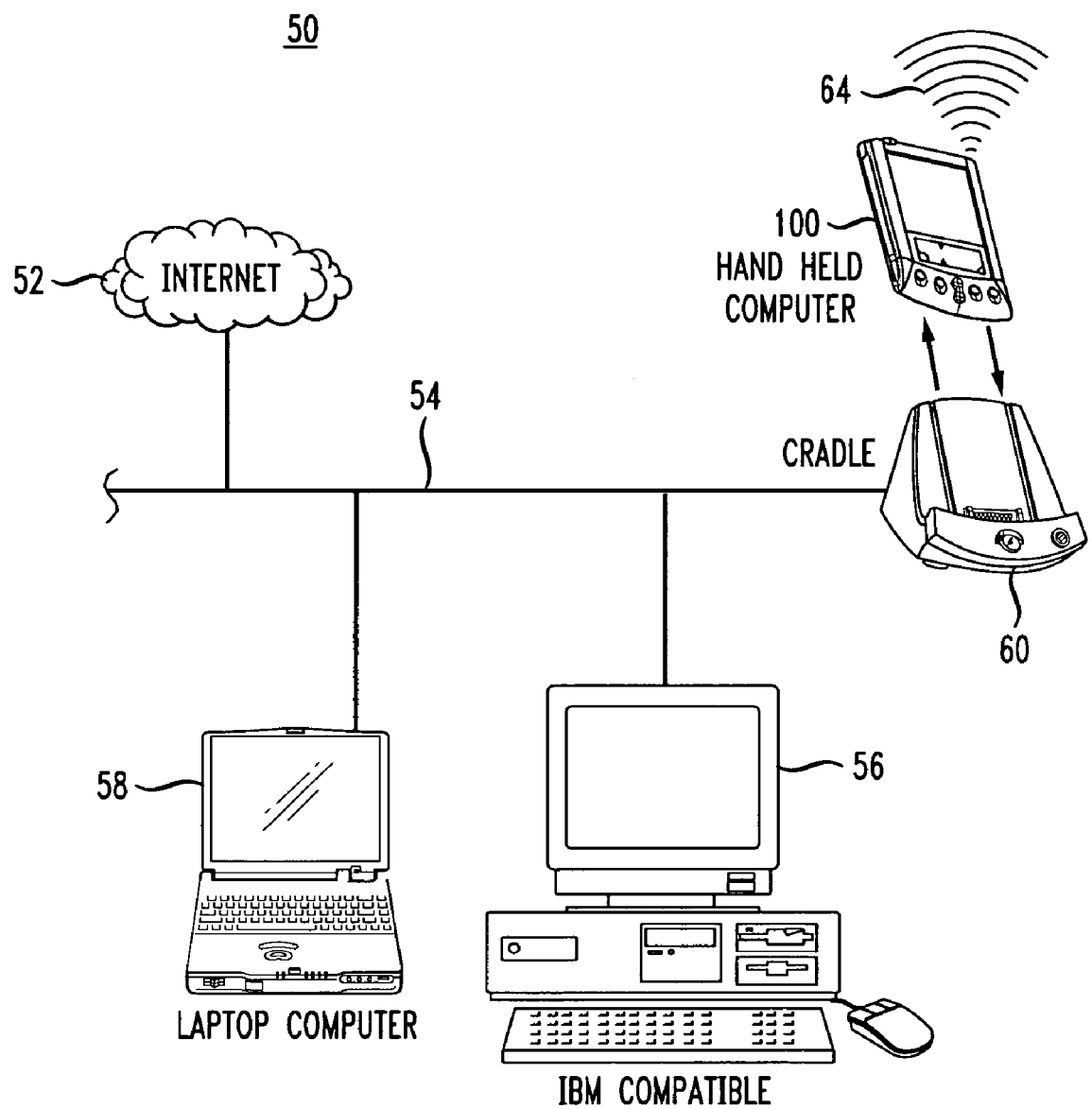
FIG. 1 is system illustration of a palmtop computer system connected to other computer systems and the Internet via a cradle device.

In the following detailed description of the present invention, a secure transaction processing arrangement for use with a palmtop computer, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed in computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

For clarity, the term "field" as used herein with reference to a field in a database is intended to have the conventionally accepted meaning in the database arts. The term "frame", as used herein, is intended to embrace database fields as represented by data entry boxes in a Web page form or a Web clipping form.

Secure Server-Based Identification for Simplified Online Transaction Processing with Palmtop Computer in Accordance with The Present Invention While this invention is susceptible of embodiment in many different forms, there is shown in the drawings and will herein be described in detail, specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

FIG. 1 illustrates a system 50 that can be used in conjunction with the secure transaction system and method of the present invention. System 50 comprises a host computer system 56 which can either be a desktop unit as shown, or, alternatively, can be a laptop or notebook computer system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Bus 54 is also coupled to a cradle 60 for receiving and initiating communication with a palmtop ("palm-sized") portable computer system 100 of the present invention. Cradle 60 provides an electrical and mechanical communication interface between bus 54 (and anything coupled to bus 54) and the computer system 100 for two-way communications. Computer system 100 may contain a wireless infrared communication mechanism 64 for sending and receiving information to and from other devices.

Figure 2A:
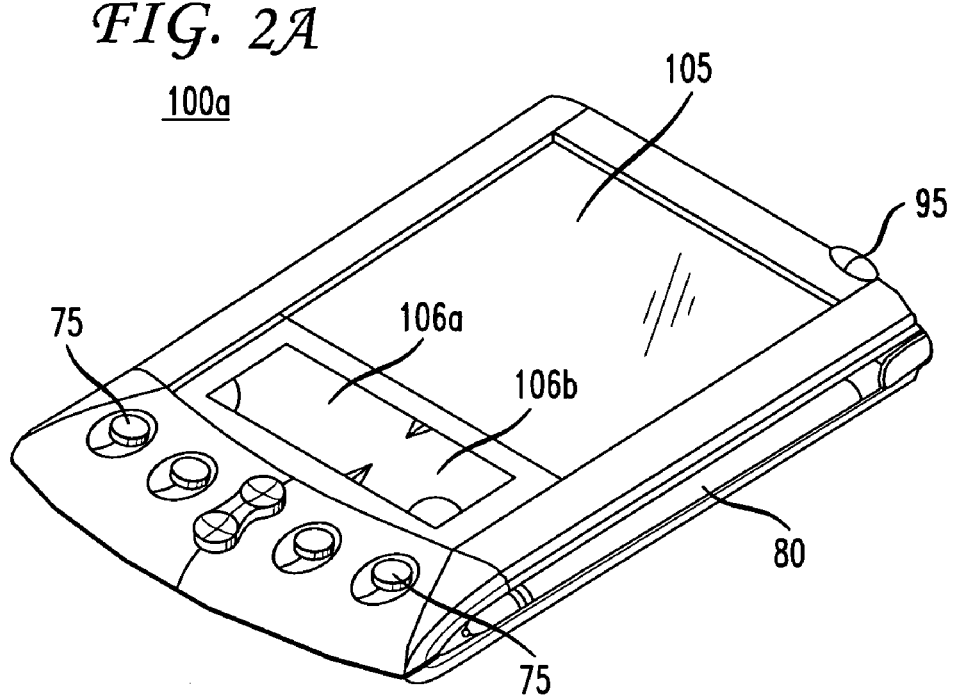
FIG. 2A is a top side perspective view of a palmtop computer system that can be used in the present invention.

FIG. 2A is a perspective illustration of the top face 100*a* of one embodiment of the palmtop computer system of the present invention. The top face 100*a* contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100*a* also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106*a* and 106*b*. Region 106*a* is for the drawing of alphabetic characters therein for automatic recognition and region 106*b* is for the drawing of numeric characters therein for automatic recognition.

The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 2B:
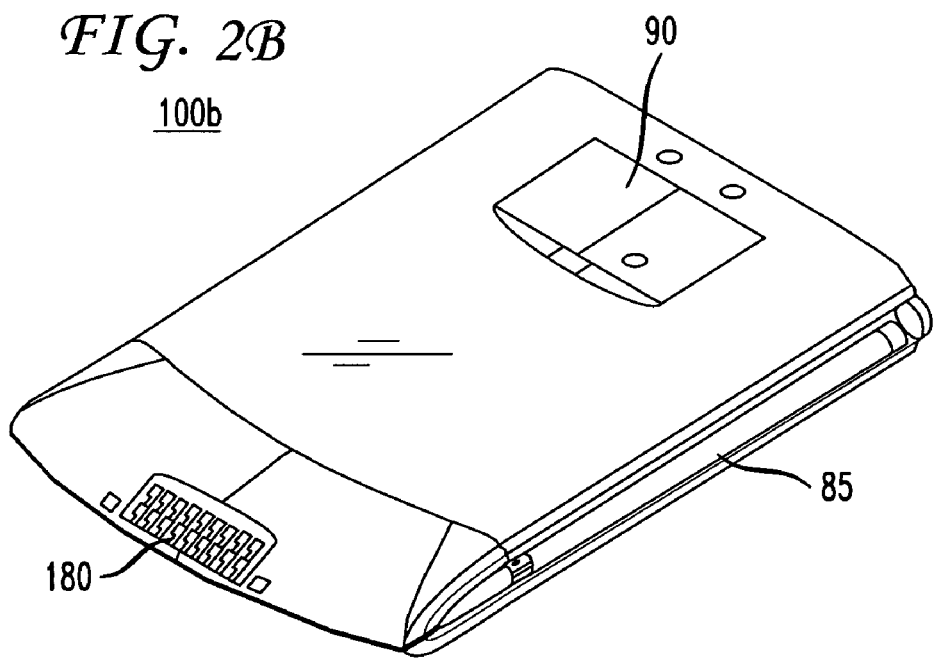
FIG. 2B is a bottom side perspective view of the palmtop computer system of FIG. 2A.

FIG. 2B illustrates the bottom side 100*b* of one embodiment of the palmtop computer system of the present invention. An extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 3:
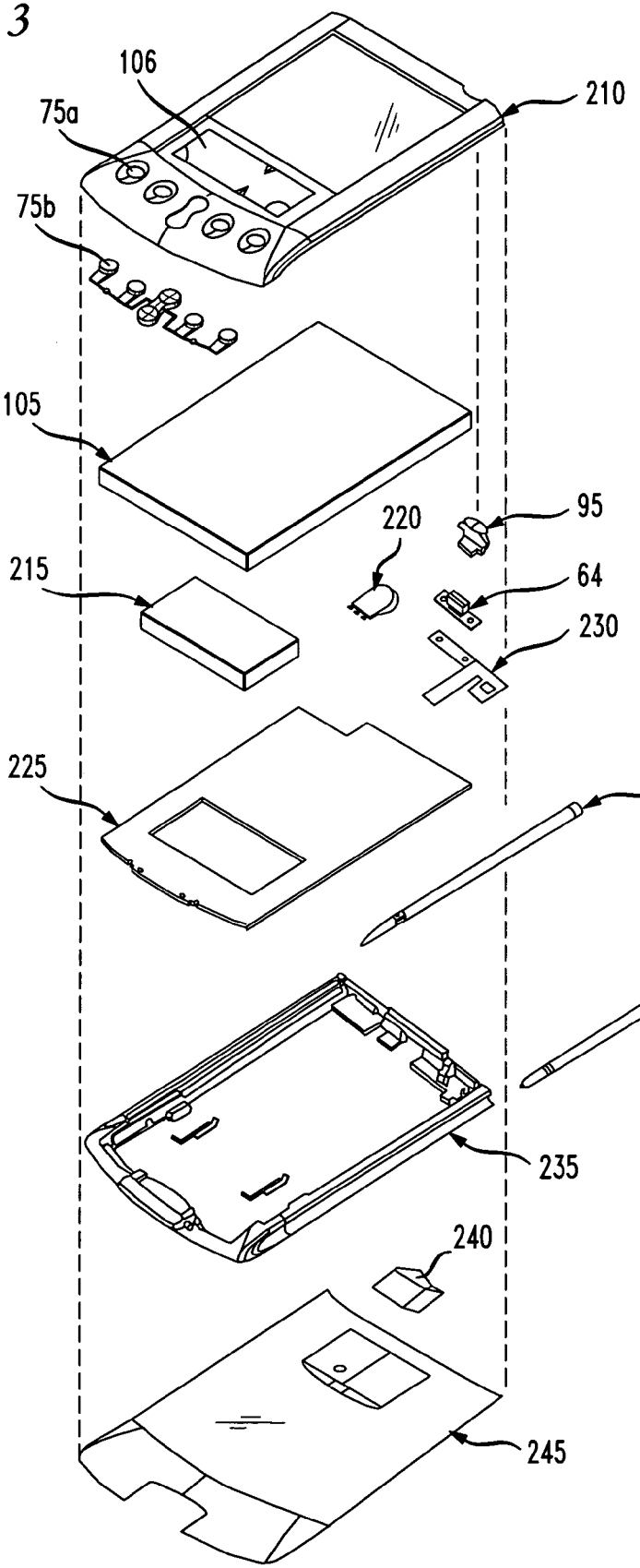
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75*a* for receiving buttons 75*b*. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown.

On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown. Antenna 85 is connected to an RF transmitter/receiver device 240 (transceiver) which provides communications with wireless data network.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server.

Figure 4:
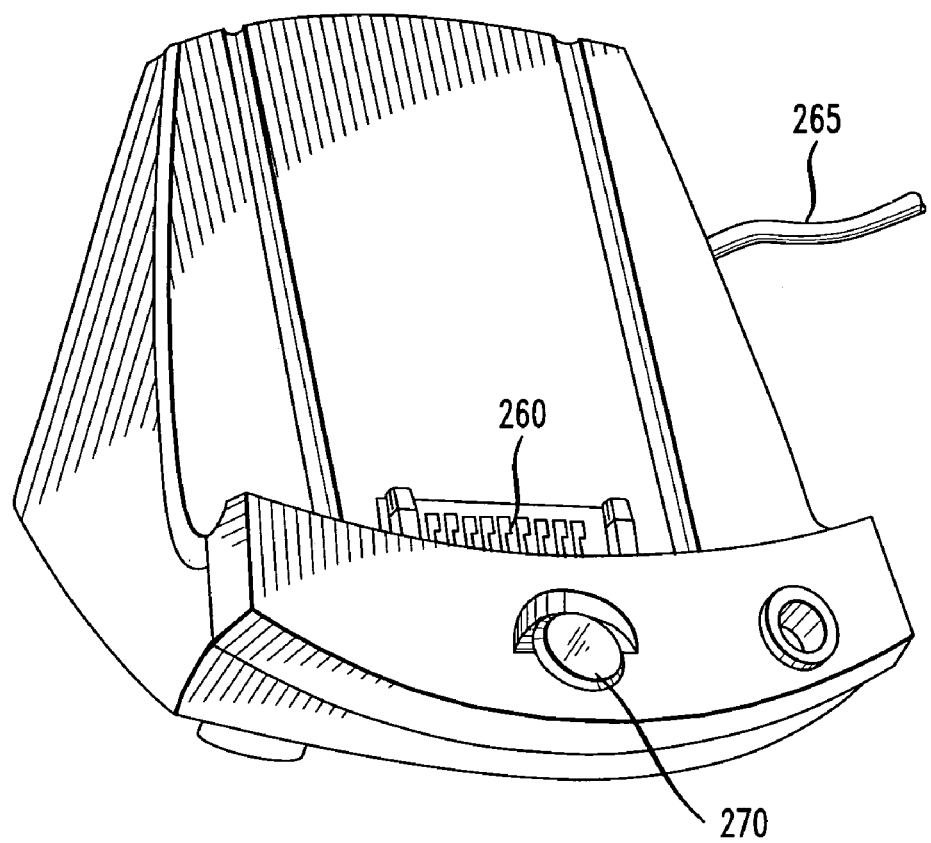
FIG. 4 is a perspective view of a cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
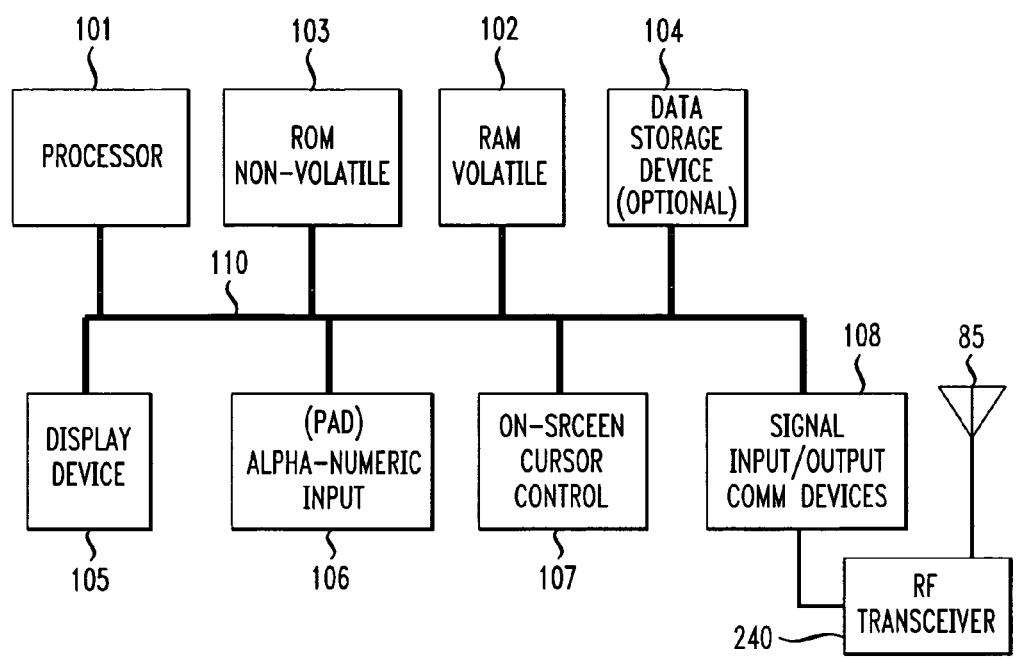
FIG. 5 is a logical block diagram of the palmtop computer system in accordance with an embodiment of the present invention.

FIG. 5 illustrates circuitry of computer system 100, some of which can be implemented on PC board 225. Computer system 100 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, system 100 also contains a display device 105 coupled to the bus 110 for displaying information to the computer user. PC board 225 can contain the processor 101, the bus 110, the ROM 103 and the RAM 102.

Also included in computer system 100 of FIG. 5 is an optional alphanumeric input device 106 which in one implementation is a handwriting recognition pad ("digitizer") having regions 106*a* and 106*b* (FIG. 2A), for instance. Device 106 can communicate information and command selections to the central processor 101. System 100 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device (I/O device) 108, also coupled to bus 110, can be a serial port for communicating with the cradle 60. Device 108 can also include an infrared communication port. As shown, the device 108 is coupled to the radio frequency transceiver 240 and antenna 85 to provide wireless communication.

Figure 6:
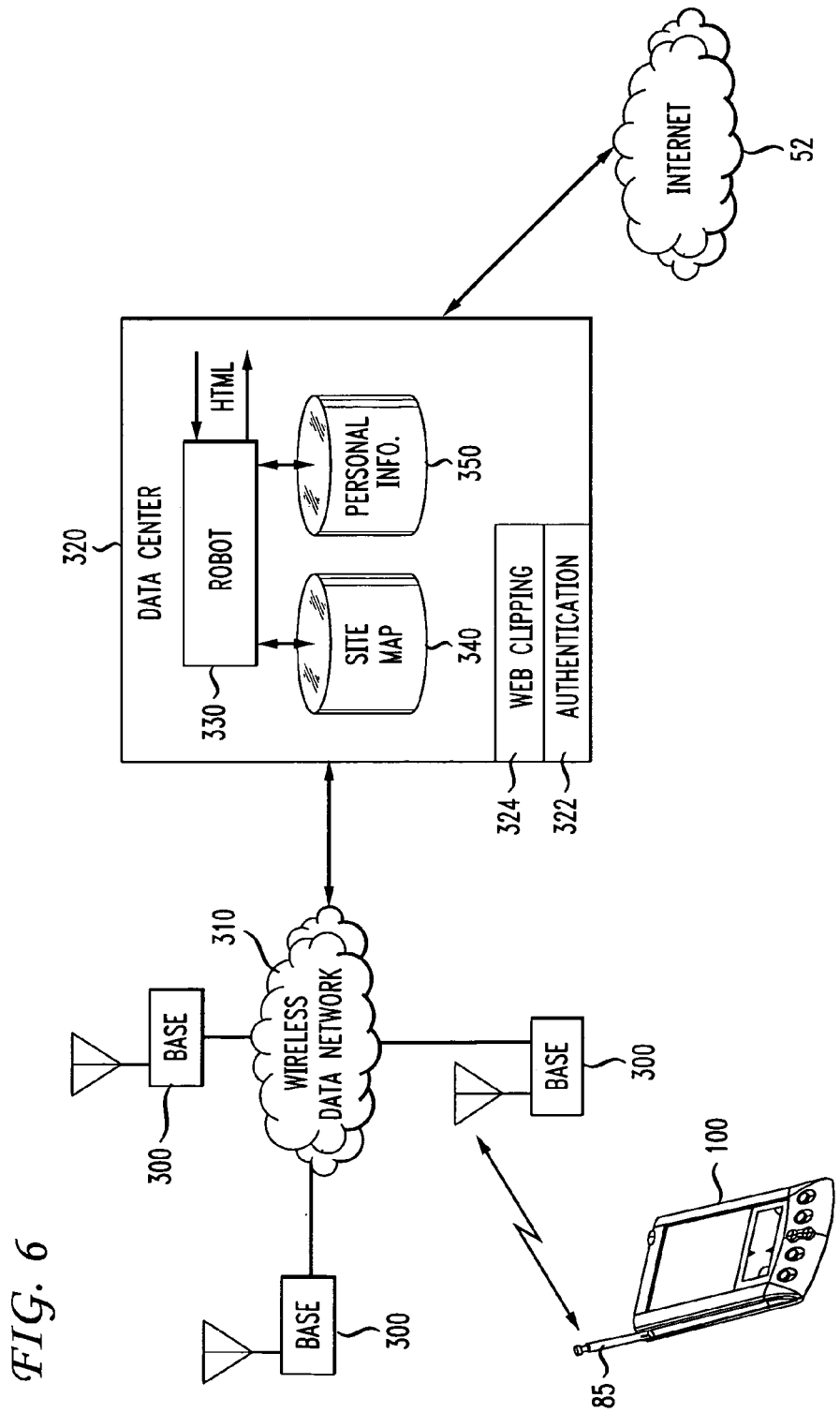
FIG. 6 is a block diagram of the major components of a wireless network in accordance with an embodiment of the present invention.

Referring now to FIG. 6, the Palmtop Computer 100 is shown as it interacts with a wireless data network. In this figure, Palmtop Computer 100 communicates via its antenna 85 with one of a plurality of base stations 300. Each of the base stations 300 is in turn connected to a wireless data network such as those used for cellular telecommunications. The wireless data network 310 is in turn coupled to a data center 320. In addition, data center 300 is connected to the Internet 52 which places all of the capabilities of the Internet and the World Wide Web at the disposal of the data center 320.

The data center 320 can provide a number of services to the Palmtop Computer 100 including authentication services provided by authentication server 322 which authenticates the identity of a user utilizing Palmtop Computer 100. Additional authentication services and encryption services may also be provided by wireless data network 310, depending upon the application. In addition, data center 320 provides a service called "Web clipping" via a Web clipping proxy server 324.

"Web clipping" is a process by which the Palmtop Computer 100 can effectively provide Internet services to the user within its environment of limited communication bandwidth, limited memory and limited processing capabilities. The concept of Web clipping is based on a principal of minimizing the amount of information that is communicated to and from Palmtop Computer 100. That is, the less data transferred the more efficient the communication system. In Web clipping, all user interaction is based on a simple query and response rather than on a system of hyperlinks as on the World Wide Web. The query portion is stored on Palmtop Computer 100 and is active when the user enters data into a request form. For example, if the user wishes to obtain a stock quote, the stock symbol may be entered into a request form without the user going on-line. The query is then submitted to the data center 320 through the wireless data network 310 in the form of a very small message (typically less than 50 bytes). The data center 320 serves as an interface to the Internet 52 which pulls the desired information from the Internet and returns a response via wireless data network 310 to the Palmtop Computer 100 in a response which is typically less than 500 bytes (compressed). As a result, the user is able to obtain the information desired from a particular Web page without having to actually browse the Internet and display Web pages on the limited resolution display of the Palmtop Computer 100. Web clipping is described in greater detail in U.S. patent application Ser. No. 09/087,515 Filed May 29, 1998 entitled "Method and Apparatus for Communicating Information Over Low Bandwidth Communications Network", naming Hawkins et al. This application is hereby incorporated by reference.

This approach has the benefits of providing near instant access to the Internet while simultaneously providing low cost of service by controlling the airtime usage. This in turn results in long battery life since transmissions from Palmtop Computer 100 may be a substantial drain on batteries.

The Web clipping proxy server 324 is responsible for converting standard Internet protocols and content from a Web page into a form that is tuned for transmission across a wireless network and for display on a very thin client device such as Palmtop Computer 100. The Web clipping proxy server 324 uses standard Internet and security protocols (TCP, HITP and SSL) to HTML servers to insure compatibility. However, on the wireless side, it adjusts everything to support extremely low bandwidth and latency. Moreover, the Web clipping proxy server 324 compresses the data from the Internet to insure maximum transmission efficiency in the wireless environment. Data center 320 having Web clipping proxy server 324 is currently implemented for the commercially available Palm VII wireless palmtop computer system as a service called Palm.net™ operated by Palm Computing, Inc.

In accordance with the present intention, data center 320 also includes a software robot 330, which is able to receive and send HTML code. This robot 330 interfaces with a site map database 340 and a personal information database 350. Site map database 340 and personal information database 350 both also reside within data center 320. While not explicitly illustrated in FIG. 6, data center 320 is preferably a "secure" data center in that it is protected by fire wall and encryption technologies to assure the security of the information stored in the data center. For purposes of this document, the term "secure" is intended to embrace any security measures such as fire walls, encryption and authentication technologies as well as physical barriers (locked doors, etc.) to provide for security of the server and/or the data center.

In accordance with the present invention, the personal information database 350 is stored within a secure server in secure data center 320 so that the user of Palmtop Computer 100 can reliably store sensitive information in the personal information database 350. In general, it might be undesirable to store such confidential information within Palmtop Computer 100 due to the ease of loss of small hand held devices, or the possibility of theft of the device or the information stored therein. Accordingly, it is advantageous to provide a convenient way for the user to obtain access to this information in electronic form, for example for completing information used in on-line transactions or for otherwise providing responses without having to manually enter data on the Palmtop Computer 100, but in a manner which assures high levels of security.

Table 1 below shows a simplified example of the type of information which might be stored in a personal information database 350. Because of the nature of the use of this database, the database 350 may contain a very substantial amount of information which will be mapped to particular Web pages as will be described later. However, for purposes of illustration, only a brief amount of information is shown in Table 1 as illustrative of that which would appear in personal information database. In this case, the database includes fields such as "First Name", Last Name", "Email Address" and "Credit Card Number". In addition, variations of the data may appear in the personal information database. For example, it may also be advantageous to have a field which is the combination of the "First+Last Name" as shown in Table I. Other example types of information which might be stored in the personal information database include age, shipping address, post office address, city, state, country, telephone number, fax number,-marital status, sex, citizenship, political party, etc. An identification field ("Customer ID") is provided to uniquely identify each user associated with each Palmtop computer with personal information stored in the personal information database.

TABLE 1

PERSONAL INFORMATION DATABASE

| FIELD | DATA |
|---|---|
| Customer ID | ASDFGHJKL-9876543210 |
| First Name | William |
| Last Name | Smith |
| First + Last Name | William Smith |
| Email Address | ws@123.net |
| ... | ... |
| ... | ... |
| ... | ... |
| Credit Card Number | 123456789 |

Figure 7:
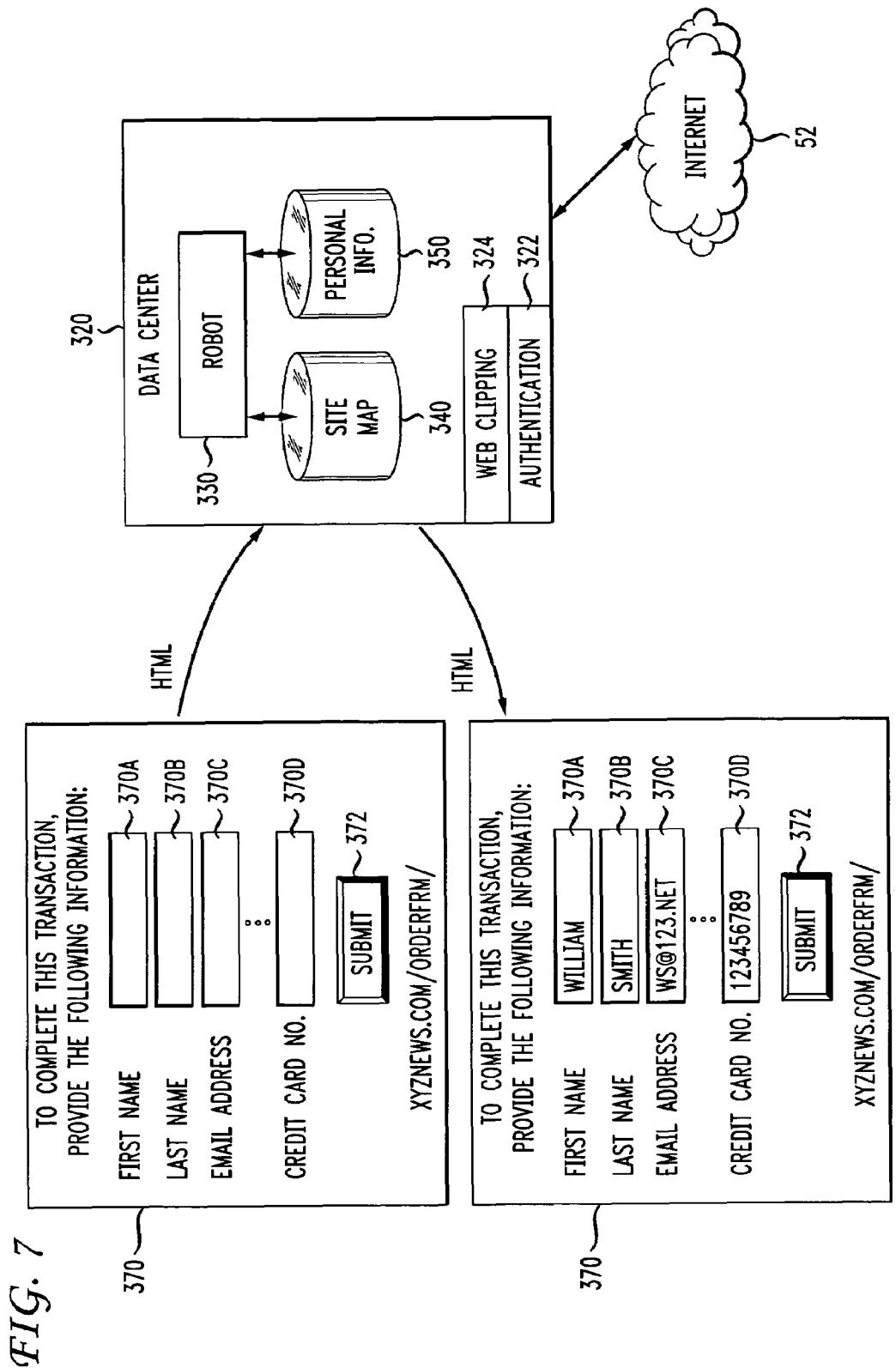
FIG. 7 is a diagram illustrating the information flow in an embodiment of the present invention.

Once the information is stored by the user in the personal information database 350, this information can be advantageously utilized to simplify the filling out of data forms and the like which a user often encounters in carrying out on-line transactions on the Internet. By way of example, and not by way of limitation, consider the fictitious example shown in FIG. 7. In this example, a Web clipping for a fictitious Web site shown as xyznews.com/orderform/ is shown. This Web clipping 370 may represent, for example, a Web clipping which permits a user to subscribe to a news service called xyznews. In order to complete the subscription, the user must submit certain personal information to the Web site, which includes identifying information as well as payment information such as a credit card number. Four such pieces of information are shown in FIG. 7 for Web clipping 370 but of course this is not to be limiting since this is simply illustrative.

When a user decides that he or she wishes to subscribe to this service, the procedure would normally be to enter data into each of the frames 370A, 370B, 370C, 370D. The user would then submit this information and be registered to the subscription desired. In accordance with the present invention, the tedium associated with entry of this data is minimized by virtue of the user taking a control action to automate the process. The control action may be implemented, for example, by a pull-down menu or a specified sequence of strokes on the input device of the Palmtop Computer 100. In any event, a transmission occurs between the Palmtop Computer 100 and the data center 320 requesting that the data center 320 automatically populate the frames of the Web clipping.

When the data center 320 receives this request, robot 320 retrieves personal information from personal information database 350 in order to accomplish this task. Robot 320 also retrieves information from site map database 340 to determine exactly how to populate frames 370A through 370D of Web clipping 370.

In order to see how robot 330 accomplishes this task, it is instructive to consider sample HTML code which might be used to create Web clipping 370 as well as to view an example of the Site map database 340. Referring to Table 2, a sample of the HTML script which might be used to represent the Web clipping 370 as originally written for an Internet Web page is shown.

TABLE 2

```
//
//
//
//
//
//
//
//
//
...
<HTML>
...
...
...
<FORM METHOD=postACTION='/cgi-bin/custdata.pl">
<BR>First Name<INPUT TYPE="text" NAME="first" SIZE="15" MAXLENGHT="25"
<BR>Last Name<INPUT TYPE="text" NAME="last" SIZE="15" MAXLENGHT="25"
<BR>Email Address<INPUT TYPE="text" NAME="email" SIZE="15" MAXLENGHT="35"
...
...
<BR>Credit Card# <INPUT TYPE="text" NAME="cardnum" SIZE="15" MAXLENGHT="15"
...
</HTML>
```

From this code, it can be determined that the information submitted upon completion of the frames of the Web clipping will ultimately be stored in a file entitled custdata.pl. It can also be determined that frame 370A representing the users first name uses the variable name "first". Similarly, the last name, E-mail address and credit card number frames 370B, 370C and 370D use variable names "last", "email" and "card num", respectively.

Referring now to Table 3, an illustration of the Site map database is shown. Site map database 340 is a database, which maps the fields of the personal information database to data entry frames in various Web clippings (representing Web sites). In the simplified example shown in Table 3, for example, two data mappings are illustrated. For xyznews, the personal information database field named "First Name" is mapped to a field named "first" in the site map database. Similarly, personal information field "Last Name" is mapped to "last" in the site map database, "Email Address" is mapped to "email" and "Credit Card Number" is mapped to "cardnum".

Other types of information may also be mapped in the site map database for each of numerous Web clippings. For example, the second illustration for a type of survey data may request age and birth date information from the personal information database which is mapped to fields called "age" and "dateofbirth" in the survey data. Thus, when Palmtop Computer 100 submits a request to populate the frames of a Web clipping such as 370, robot 330 correlates the data fields of the Web clipping 370 with data fields in the personal information database and returns the data to populate fields 370A, 370B, 370C through 370D in frame 370. The user may then submit the data by tapping the submit icon 372 for example to complete the on-line transaction.

TABLE 3

SITE MAP DATABASE

| PIDB Field | XYZNEWS.COM/ ORDERFRM/ | XXXX.COM/ SURVEYDATA |
|---|---|---|
| First Name | first | |
| Last Name | last | |
| First + Last Name | | surveyed_name |
| ... | ... | ... |

TABLE 3-continued

SITE MAP DATABASE

| Email Address | Email | Emailaddress |
|---|---|---|
| ... | ... | ... |
| Age | | Age |
| Birth Data | | Dateofbirth |
| ... | ... | ... |
| Credit Card Number | cardnum | |

Those skilled in the art will appreciate that authentication functions and encryption functions should also be incorporated in the various transmissions associated with the present invention in order to maintain the security of personal information.

Figure 8:
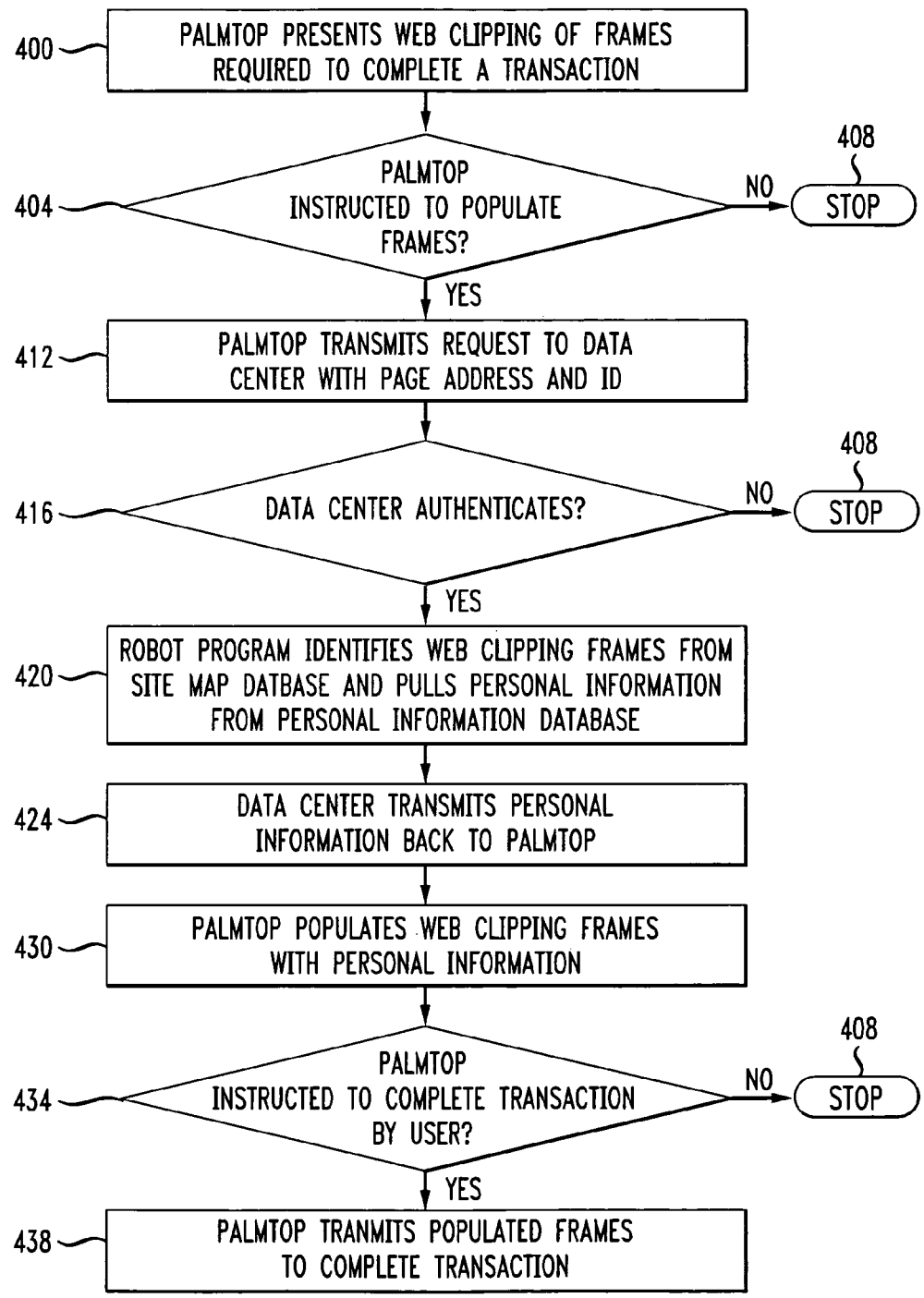
FIG. 8 is a flow chart describing operation of the present invention in certain embodiments.

Referring now to FIG. 8, the process previously described is summarized in the form of a flow chart. At 400 the Palmtop Computer 100 presents a Web clipping containing frames which are to be filled to complete a transaction. At 404, the user can instruct the Palmtop Computer 100 to implement a process of populating the frames. If no such instruction is given or if the user takes other action the process stops at 408. If, at 404, the Palmtop Computer 100 is instructed to populate the frames, control passes to 412 where the Palmtop Computer 100 transmits a request to the data center 320 to assist in populating the frames. In general, such a request may include a user identification (e.g. user ID and password) used for authentication in the authentication server 322 as well as an Internet address for the page to be populated. If the data center's authentication server fails to authenticate the user at 416, the process again stops at 408. If the user is authenticated at 416, robot program 330 identifies the Web clipping frames from the site map database and pulls personal information from the personal information database which is needed to populate those Web clipping frames at 420. Data center 320 then transmits the personal information back to the Palmtop Computer 100 at 424 in encrypted or enciphered form.

At 430, Palmtop Computer 100 receives the transmission and populates the Web clipping frames with the personal information transmitted from the data center 320. At 434, the user has the option of completing the transaction or aborting.

If the user chooses to abort control passes again to 408 which terminates the process. If, however, the user chooses to complete the transaction at 434, Palmtop Computer 100 transmits the populated frame to complete the transaction at 438. Again, since the transmission includes sensitive personal information, the transmission should be enciphered or encrypted to protect the security of the information. Once this transmission has occurred, the data center sends the information along to the Internet Web page to complete the transaction.

Those skilled in the art will recognize that various protocols can be used to utilized to effect the above transmissions. Moreover, there are many possible implementation details which have not been described herein but would be within the skill of those of ordinary skill in the art. For example, while the invention has been described in terms of transmitting a Web clipping or Web page address from the Palmtop Computer 100 to the data center, the Palmtop Computer 100 could also simply transmit the names of each of the frames to be populated or the variables which are required. The data center, could track the activity of the Palmtop Computer 100 to know which Web clipping and Web page this data correlates to. Also, in a slight variation of the present invention, when the user requests that the data center provide information to populate a Web page, the data center may simply populate the page and forward it to the appropriate address on the Internet without further interaction of the Palmtop Computer 100. Additionally, although the preferred embodiment is used to populate a Web clipping as described herein, this invention can be used to automatically populate any form such as an HTML or XML form without departing from the present invention. These and other variations will occur to those of ordinary skill in the art upon consideration of the proceeding discussion.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for providing transaction processing in a portable computing device, comprising the steps of:
   providing a secure file server to serve as an intermediate interface to an internet access;
   providing a personal information database, residing on the secure file server, containing personal information data relating to a user of the portable computing device;
   providing a site map database, residing on the secure file server, the site map database containing data which maps fields of the personal information database to frames of known Web clippings;
   receiving a request from computer portable computing device to populate frames of a selected Web clipping;
   retrieving personal information data from the personal information database for fields mapped to the frame in the selected Web clipping in the site map database; and
   transmitting the retrieved personal information to the portable computing device palmtop computer;
   wherein the secure file server is configured to process wireless queries and wherein the portable computing device accesses Internet resources using said secure file server as the intermediate coupling without directly connecting to the Internet.

2. The method of claim 1, further comprising the step of:
   populating the frames of the selected Web clipping in the portable computing device.

3. The method of claim 2, further comprising the step of:
   transmitting the populated frame from the portable computing device to a Web site.

4. The method of claim 1, wherein the storing the site map comprises scraping a Web site to harvest frames to be populated.

5. The method of claim 1, wherein the personal information database is manually populated with data by the user.

6. The method of claim 1, wherein the Web clipping correlates to a Web page on the World Wide Web.

7. The method of claim 1, further comprising the step of:
   mapping the portable computing device to a user in the personal information database.

8. The method of claim 1, wherein the receiving and transmitting steps are carried out over a wireless data communication network.

9. A method for providing simplified transaction processing in a portable computing device, comprising the steps of:
   sending a wireless request from the portable computing device to a secure file server configured to serve as an interface between the portable computing device and the Internet to obtain information to populate a plurality of frames of a selected Web clipping wherein the potable computing device utilizes Internet resources using the secure file server as an intermediate coupling without directly connecting to the Internet and without the portable computing device downloading the selected web clipping;
   receiving a wireless transmission from the secure file server containing personal information data extracted from a personal information database, the personal information database residing on the secure file server, and containing personal information data relating to a user of the portable computing device;
   wherein, the personal information being retrieved from fields in the personal information database which have been mapped to frames in the selected Web clipping in the site map database.

10. The method of claim 9, further comprising the step of:
    transmitting the retrieved personal information to the portable computing device.

11. The method of claim 10, further comprising the step of:
    populating the frames of the selected Web clipping in the portable computing device.

12. The method of claim 11, further comprising the step of:
    transmitting the populated frames of the selected Web clipping to a Web site for transaction processing.

13. The method of claim 12, wherein the populated frames of the selected Web clipping are transferred to the Web site through a data center, which translates between Web clippings and Web pages.

14. The method of claim 9, wherein the sending and receiving steps are carried out over a wireless data communication network.

15. A portable computing device, comprising:
a radio frequency transmitter for sending a wireless request from the portable computing device to a secure file server configured to interface between the portable computing device and the Internet to obtain information to populate a plurality of frames of a selected Web clipping wherein the portable computing device utilizes Internet resources using the secure file server as an intermediary without directly connecting to the Internet and without the portable computing device downloading the selected web clipping;
a radio receiver for receiving a transmission from the secure file server containing personal information data extracted from a personal information database, the personal information database residing on the secure file server, and containing personal information data relating to a user of the portable computing device; and
a processor which populates the frames of the selected Web clipping with the personal information data received.

16. The portable computing device of claim 15, wherein the request comprises a label for a Web clipping containing the frames to be populated.

17. The portable computing device of claim 15, further comprising:
a structure for transmitting the populated Web clipping to a Web site.

18. The portable computing device of claim 17, wherein the populated Web clipping is conveyed to the Web site through a data center containing the secure file server.

* * * * *